United States Patent
Muthuraman et al.

(10) Patent No.: US 11,182,179 B2
(45) Date of Patent: Nov. 23, 2021

(54) SYSTEM AND METHOD FOR SIMPLE OBJECT ACCESS PROTOCOL (SOAP) INTERFACE CREATION

(71) Applicant: ServiceNow, Inc., Santa Clara, CA (US)

(72) Inventors: Raghavan Muthuraman, Bangalore (IN); Swati Agarwal, Hyderabad (IN); Sumit Rathi, Hyderabad (IN)

(73) Assignee: ServiceNow, Inc., Santa Clara, CA (US)

( * ) Notice: Subject to any disclaimer, the term of this patent is extended or adjusted under 35 U.S.C. 154(b) by 426 days.

(21) Appl. No.: 16/233,580

(22) Filed: Dec. 27, 2018

(65) Prior Publication Data

US 2020/0210215 A1     Jul. 2, 2020

(51) Int. Cl.
| | |
|---|---|
| *G06F 9/451* | (2018.01) |
| *G06F 8/33* | (2018.01) |
| *G06F 8/38* | (2018.01) |
| *H04L 12/24* | (2006.01) |
| *G06F 8/34* | (2018.01) |

(52) U.S. Cl.
CPC ............... *G06F 9/453* (2018.02); *G06F 8/33* (2013.01); *G06F 8/34* (2013.01); *G06F 8/38* (2013.01); *H04L 41/0273* (2013.01)

(58) Field of Classification Search
CPC ... G06F 9/453; G06F 8/34; G06F 8/33; G06F 8/38; G06F 11/3684; H04L 41/0273; G06Q 10/0633
See application file for complete search history.

(56) References Cited

U.S. PATENT DOCUMENTS

| | | | |
|---|---|---|---|
| 5,893,105 A * | 4/1999 | MacLennan | ............... G06F 8/34 |
| 6,678,887 B1 | 1/2004 | Hallman | |
| 7,020,706 B2 | 3/2006 | Cates | |
| 7,350,209 B2 | 3/2008 | Shum | |
| 7,716,353 B2 | 5/2010 | Golovinsky | |
| 7,769,718 B2 | 8/2010 | Murley | |
| 7,890,802 B2 | 2/2011 | Gerber | |
| 7,925,981 B2 | 4/2011 | Pourheidari | |
| 8,151,202 B1 * | 4/2012 | Cronin | ..................... G06F 9/453 |
| | | | 715/764 |
| 8,224,683 B2 | 7/2012 | Manos | |
| 8,301,720 B1 * | 10/2012 | Thakker | ............... G06F 11/3414 |
| | | | 709/217 |
| 8,402,127 B2 | 3/2013 | Solin | |
| (Continued) | | | |

OTHER PUBLICATIONS

Microsoft Computer Dictionary, 2002, Microsoft Press, Fifth Edition, p. 474 (Year: 2002).*

(Continued)

*Primary Examiner* — Nicholas Klicos
(74) *Attorney, Agent, or Firm* — Fletcher Yoder PC (57) ABSTRACT

A computing system includes a server. The server is communicatively coupled to a data repository and is configured to perform operations comprising creating, via a visual information flow creation tool, at least one information flow object. The server is additionally configured to perform operations comprising creating a simple object access protocol (SOAP) interface for the at least one information flow object, and executing the at least one information flow object to communicate with an external system via the SOAP interface.

20 Claims, 7 Drawing Sheets

(56) References Cited

U.S. PATENT DOCUMENTS

| | | |
|---|---|---|
| 8,612,408 B2 | 12/2013 | Non |
| 8,983,982 B2 | 3/2015 | Rangarajan |
| 9,065,783 B2 | 6/2015 | Ding |
| 9,098,322 B2 | 8/2015 | Apte |
| 9,122,552 B2 | 9/2015 | Whitney |
| 9,317,327 B2 | 4/2016 | Apte |
| 9,508,051 B2 | 11/2016 | Falk |
| 9,535,674 B2 | 1/2017 | Cooper |
| 9,535,737 B2 | 1/2017 | Joy |
| 9,557,969 B2 | 1/2017 | Sharma |
| 9,654,473 B2 | 5/2017 | Miller |
| 9,766,935 B2 | 9/2017 | Kelkar |
| 9,792,387 B2 | 10/2017 | George |
| 9,805,322 B2 | 10/2017 | Kelkar |
| 10,496,379 B2 * | 12/2019 | Pragya ............... G06F 11/3684 |
| 2003/0036813 A1 * | 2/2003 | Gasiorek ............ G05B 19/0426 |
| | | 700/87 |
| 2003/0177264 A1 * | 9/2003 | Elvanoglu ........... H04L 67/2804 |
| | | 709/243 |
| 2005/0086360 A1 | 4/2005 | Mamou et al. |
| 2005/0144137 A1 * | 6/2005 | Kumar, V ............... H04L 67/02 |
| | | 705/55 |
| 2006/0173951 A1 * | 8/2006 | Arteaga ................. H04L 67/02 |
| | | 709/203 |
| 2007/0239858 A1 | 10/2007 | Banerji et al. |
| 2009/0044185 A1 * | 2/2009 | Krivopaltsev ...... H04L 41/0806 |
| | | 717/173 |
| 2010/0287418 A1 | 11/2010 | Khanna |
| 2010/0312542 A1 * | 12/2010 | Wyk ..................... G06Q 10/00 |
| | | 703/22 |
| 2012/0078547 A1 * | 3/2012 | Murdoch ............... G01D 4/004 |
| | | 702/62 |
| 2013/0159892 A1 * | 6/2013 | Suraj ..................... G06F 16/958 |
| | | 715/762 |
| 2016/0239170 A1 * | 8/2016 | Gilboa ................. G06F 40/166 |
| 2018/0129480 A1 * | 5/2018 | Germanakos ............ G06F 8/20 |
| 2018/0232216 A1 * | 8/2018 | White ...................... G06F 8/34 |
| 2019/0188006 A1 * | 6/2019 | Ritter ....................... G06F 8/20 |

OTHER PUBLICATIONS

International Search Report and Written Opinion for PCT Application No. PCT/US2019/06361 dated Apr. 24, 2020; 10 pgs.

* cited by examiner

SYSTEM AND METHOD FOR SIMPLE OBJECT ACCESS PROTOCOL (SOAP) INTERFACE CREATION

BACKGROUND

The present disclosure relates generally to a system and method for creating and executing interfaces to objects and services that may be accessible via a simple object access protocol (SOAP).

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations, which resources may be used to perform a variety computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able redirect their resources to focus on their enterprise's core functions.

Within the context of cloud computing solutions for data repositories, users may be asked to deal with ever increasing amounts of data, e.g., including certain date-based information stored in the data repositories. In fact, the amount of cloud-based and date-based data collected and stored in today's cloud computing solutions, such as cloud-based repositories, may be orders of magnitude greater than what was historically collected and stored. Users tasked with automating and/or troubleshooting enterprise, IT, and/or other organization-related functions (e.g., incident tracking and/or help desk-related functions) navigate ever increasing amounts of date-based data to properly and efficiently perform their job functions. In certain embodiments, cloned data repositories may be created. With this in mind, the following embodiments are directed to improving the manner in which certain objects for certain data repositories, including cloned data repositories, may operate via SOAP.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Information Technology (IT) networks may include a number of computing devices, server systems, databases, and the like that generate, collect, and store information. As increasing amounts of data representing vast resources become available, it becomes increasingly difficult to analyze the data, interact with the data, and/or provide reports for the data. The current embodiments enable customized systems and methods that may include an integration hub having a simple object access protocol (SOAP) "spoke." The SOAP spoke may be used to create interfaces to objects and services accessible via a simple object access protocol (SOAP). For example, a Flow Designer system may be used to create software objects, such as flows, actions, and/or steps that may then use the SOAP spoke to interact with a variety of third party services and/or objects via SOAP.

In certain embodiments, a "wizard" system may provide for a graphical user interface (GUI) that includes textboxes, drop down menus, radio buttons, and other GUI controls. The GUI controls may be used to enter information useful in identifying and using the third party services and/or objects used creating the SOAP interfaces via the SOAP spoke. The information may include connection information, authentication information, request information, language information (e.g., programming code or instructions), and so on. The wizard system may then automatically create an interface that may be used via the Flow Designer to access the third party services and/or objects via SOAP, as further described below.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device that includes, but is not limited to a computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code.

Present embodiments are directed to creating one or more simple object access protocol (SOAP) interfaces via a SOAP spoke. As used herein, the term "spoke" may refer to a software system that is included as a subsystem of an integration hub. The phrase "integration hub" may defined herein as a software system that may provide for "codeless" development and integration with the aforementioned spokes. More specifically, the integration hub may include or operatively couple with a Flow Designer system that provides "codeless" development of software via natural language and visual information presentation. "Codeless" development may be defined herein as software development were the creator of the software does not use a computer language, e.g., Java, Javascript, C#, and the like. Instead, the creator of the software may use natural language and visual tools to create the software, for example, by designing a flowchart-like process that may take certain inputs and executes certain actions, as further described below.

The integration hub may enable the Flow Designer system to use the various spokes to create certain automated processes without having to create code via traditional computer languages. For example, the automated processes may interact via SOAP to provide enhanced functionality by accessing any number of services, such as web-based services, that may include weather forecasting services, financial services, information technology services, engineering services and the like. Further, the Flow Designer system and/or integration hub may include or operatively couple with a SOAP "wizard." As used herein, the SOAP wizard may refer to a setup assistant or user interface type that may present a user with a sequence of one or more dialog boxes that aid the user in accomplishing the setup of one or more SOAP services.

With the preceding in mind, the following figures relate to various types of generalized system architectures or configurations that may be employed to provide services to an organization accessing a cloud-platform, such as may be embodied in a multi-instance or multi-tenant framework on which the present approaches may be employed. Correspondingly, these system and platform examples may also relate to systems and platforms on which the techniques discussed herein may be implemented or otherwise utilized.

Figure 1:
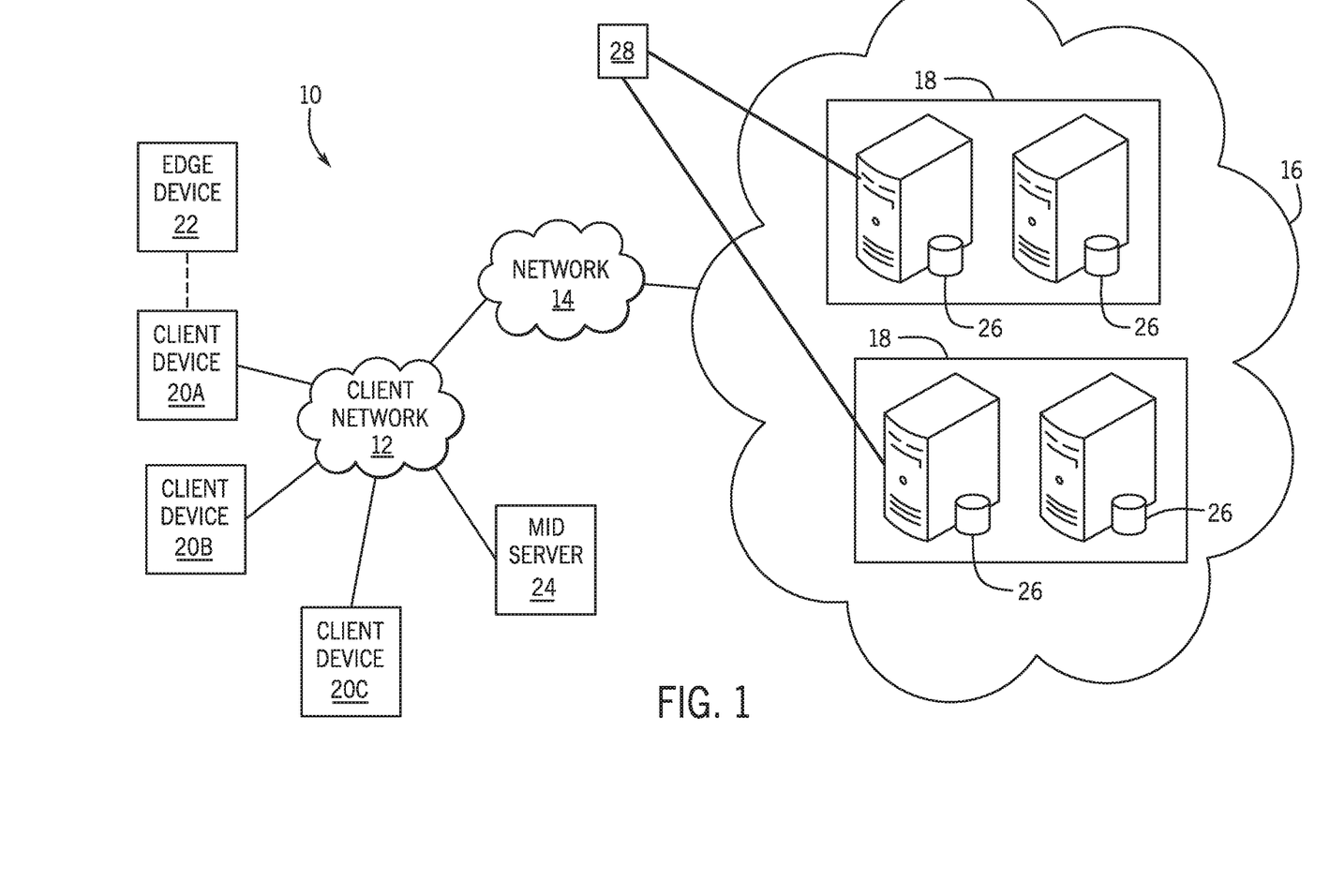
FIG. 1 is a block diagram of an embodiment of a multi-instance cloud architecture in which embodiments of the present disclosure may operate.

Turning now to FIG. 1, a schematic diagram of an embodiment of a cloud computing system 10 in which embodiments of the present disclosure may operate, is illustrated. The cloud computing system 10 may include a client network 12, a network 14 (e.g., the Internet), and a cloud-based platform 16. In some implementations, the cloud-based platform 16 may be a configuration management database (CMDB) platform. In one embodiment, the client network 12 may be a local private network, such as local area network (LAN) that includes a variety of network devices that include, but are not limited to, switches, servers, and routers. In another embodiment, the client network 12 represents an enterprise network that could include one or more LANs, virtual networks, data centers 18, and/or other remote networks. As shown in FIG. 1, the client network 12 is able to connect to one or more client devices 20A, 20B, and 20C so that the client devices are able to communicate with each other and/or with the network hosting the platform 16. The client devices 20 may be computing systems and/or other types of computing devices generally referred to as Internet of Things (IoT) devices that access cloud computing services, for example, via a web browser application or via an edge device 22 that may act as a gateway between the client devices 20 and the platform 16. FIG. 1 also illustrates that the client network 12 includes a management, instrumentation, and discovery (MID) server 24 that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to the network 14, which may include one or more computing networks, such as other LANs, wide area networks (WAN), the Internet, and/or other remote networks, in order to transfer data between the client devices 20 and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM) based cellular network), WiFi® networks (WIFI is a registered trademark owned by Wi-Fi Alliance Corporation), and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14.

In FIG. 1, the network hosting the platform 16 may be a remote network (e.g., a cloud network) that is able to communicate with the client devices 20 via the client network 12 and network 14. The network hosting the platform 16 provides additional computing resources to the client devices 20 and/or the client network 12. For example, by utilizing the network hosting the platform 16, users of the client devices 20 are able to build and execute applications for various enterprise, IT, and/or other organization-related functions. In one embodiment, the network hosting the platform 16 is implemented on the one or more data centers 18, where each data center could correspond to a different geographic location. Each of the data centers 18 includes a plurality of virtual servers 26 (also referred to herein as application nodes, application servers, virtual server instances, application instances, or application server instances), where each virtual server 26 can be implemented on a physical computing system, such as a single electronic computing device (e.g., a single physical hardware server) or across multiple-computing devices (e.g., multiple physical hardware servers). Examples of virtual servers 26 include, but are not limited to a web server (e.g., a unitary Apache installation), an application server (e.g., unitary Java® Virtual Machine), and/or a database server, e.g., a unitary MySQL® catalog (MySQL® is a registered trademark owned by MySQL AB A COMPANY).

It would be beneficial to integrate the virtual servers 26 with external systems, such as systems 28. The systems 28 may provide, for example, for web-based services accessible via a simple object access protocol (SOAP). SOAP may include messaging protocol that allows software that run on disparate operating systems (such as Windows and Linux) to communicate using Hypertext Transfer Protocol (HTTP) and its Extensible Markup Language (XML). The techniques described in further detail below may enable the creation of SOAP interfaces, for example via a SOAP wizard, suitable for providing communications between the servers 26 and the external systems 28. Accordingly, web-based services such as weather forecasting services, financial services, information technology (IT) services, and so on, may be accessed from the virtual servers 26.

Figure 2:
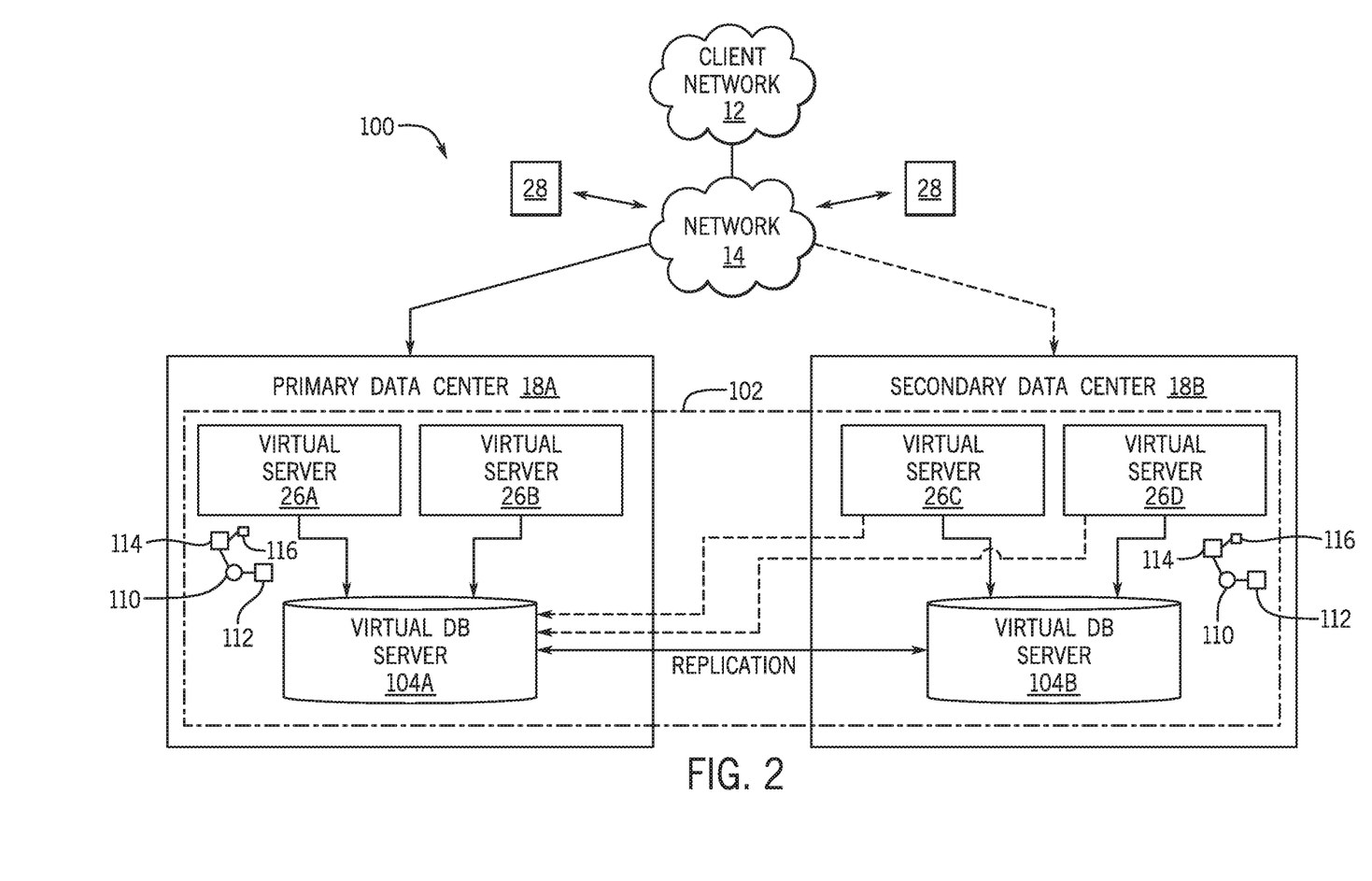
FIG. 2 is a block diagram of a computing device utilized in the distributed computing system of FIG. 1, in accordance with an embodiment.

To utilize computing resources within the platform 16, network operators may choose to configure the data centers 18 using a variety of computing infrastructures. In one embodiment, one or more of the data centers 18 are configured using a multi-tenant cloud architecture, such that one of the server instances 26 handles requests from and serves multiple customers. Data centers 18 with multi-tenant cloud architecture commingle and store data from multiple customers, where multiple customer instances are assigned to one of the virtual servers 26. In a multi-tenant cloud architecture, the particular virtual server 26 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 26 causing outages for all customers allocated to the particular server instance.

In another embodiment, one or more of the data centers 18 are configured using a multi-instance cloud architecture to provide every customer its own unique customer instance or instances. For example, a multi-instance cloud architecture could provide each customer instance with its own dedicated application server and dedicated database server. In other examples, the multi-instance cloud architecture could deploy a single physical or virtual server 26 and/or other combinations of physical and/or virtual servers 26, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules. An example of implementing a customer instance within a multi-instance cloud architecture will be discussed in more detail below with reference to FIG. 2.

FIG. 2 is a schematic diagram of an embodiment of a multi-instance cloud architecture 100 where embodiments of the present disclosure may operate. FIG. 2 illustrates that the multi-instance cloud architecture 100 includes the client network 12 and the network 14 that connect to two (e.g., paired) data centers 18A and 18B that may be geographically separated from one another. Using FIG. 2 as an example, network environment and service provider cloud infrastructure client instance 102 (also referred to herein as a client instance 102) is associated with (e.g., supported and enabled by) dedicated virtual servers (e.g., virtual servers 26A, 26B, 26C, and 26D) and dedicated database servers (e.g., virtual database servers 104A and 104B). Stated another way, the virtual servers 26A-26D and virtual database servers 104A and 104B are not shared with other client instances and are specific to the respective client instance 102. In the depicted example, to facilitate availability of the client instance 102, the virtual servers 26A-26D and virtual database servers 104A and 104B are allocated to two different data centers 18A and 18B so that one of the data centers 18 acts as a backup data center. Other embodiments of the multi-instance cloud architecture 100 could include other types of dedicated virtual servers, such as a web server. For example, the client instance 102 could be associated with (e.g., supported and enabled by) the dedicated virtual servers 26A-26D, dedicated virtual database servers 104A and 104B, and additional dedicated virtual web servers (not shown in FIG. 2).

In the depicted embodiment, an integration hub system 110 may be operatively coupled to or include a Flow Designer system 112. The integration hub system 110 may enable the execution of third party application programming interfaces (APIs), including objects, automated process, and so on, such as APIs included in the external systems 28. More specifically, the integration hub system 110 may enable the creation of one or more SOAP spokes 114 suitable for interfacing with the external systems 28 by using, for example, SOAP messaging. For example, automation processes created by the Flow Designer system 112 as further described below may use the SOAP spokes 114 to interface with the external systems 28.

In the depicted embodiment, a SOAP wizard system 116 may be used to create the SOAP spokes 114. That is, a user of the of integration hub system 110 and/or the Flow Designer system 112 may be guided by the SOAP wizard system 116 to enter certain information, described in further detail below, suitable for interacting with services provided by the external systems 28. The SOAP wizard system 116 may collaborate with the integration hub system 110 to provide for a more efficient creation of an application, e.g., scoped application, on a development instance of the servers 26 to build the SOAP spokes 114.

The SOAP spokes 114 may then be published in an application repository. The application repository may then be used to create a test server instance running the scoped application. Accordingly, the application may be more easily tested before being deployed. Once testing is complete, the application may be published in various ways, such as publishing to production instances of the servers 26, to online application stores, and/or via sharing facilities.

Although FIGS. 1 and 2 illustrate specific embodiments of a cloud computing system 10 and a multi-instance cloud architecture 100, respectively, the disclosure is not limited to the specific embodiments illustrated in FIGS. 1 and 2. For instance, although FIG. 1 illustrates that the platform 16 is implemented using data centers, other embodiments of the platform 16 are not limited to data centers and can utilize other types of remote network infrastructures. Moreover, other embodiments of the present disclosure may combine one or more different virtual servers into a single virtual server. Using FIG. 2 as an example, the virtual servers 26A, 26B, 26C, 26D and virtual database servers 104A, 104B may be combined into a single virtual server. The use and discussion of FIGS. 1 and 2 are only examples to facilitate ease of description and explanation of discrete or functional concepts and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
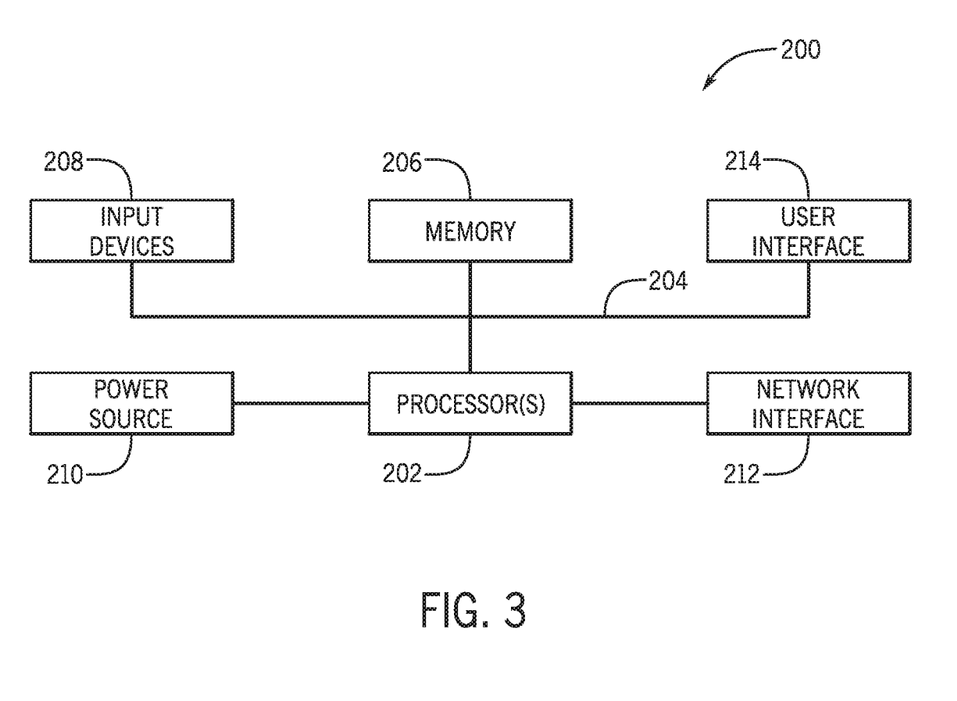
FIG. 3 is a block diagram of an embodiment of a computing device utilized in a computing system that may be present in FIG. 1 or 2, in accordance with aspects of the present disclosure.

With this in mind, and by way of background, it may be appreciated that the present approach may be implemented using one or more processor-based systems such as shown in FIG. 3. Likewise, applications and/or databases utilized in the present approach stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 200 and their potential interconnections or communication paths, such as along one or more busses. As illustrated, the computing system 200 may include various hardware components such as, but not limited to, one or more processors 202, one or more busses 204, memory 206, input devices 208, a power source 210, a network interface 212, a user interface 214, and/or other computer components useful in performing the functions described herein.

The one or more processors 202 may include one or more microprocessors capable of performing instructions stored in the memory 206. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206.

With respect to other components, the one or more busses 204 includes suitable electrical channels to provide data and/or power between the various components of the computing system 200. The memory 206 may include any tangible, non-transitory, and computer-readable storage media. Although shown as a single block in FIG. 1, the memory 206 can be implemented using multiple physical units of the same or different types in one or more physical locations. The input devices 208 correspond to structures to input data and/or commands to the one or more processor 202. For example, the input devices 208 may include a mouse, touchpad, touchscreen, keyboard and the like. The power source 210 can be any suitable source for power of the various components of the computing device 200, such as line power and/or a battery source. The network interface 212 includes one or more transceivers capable of communicating with other devices over one or more networks (e.g., a communication channel). The network interface 212 may provide a wired network interface or a wireless network interface. A user interface 214 may include a display that is configured to display text or images transferred to it from the one or more processors 202. In addition and/or alternative to the display, the user interface 214 may include other devices for interfacing with a user, such as lights (e.g., LEDs), speakers, and the like.

Figure 4:
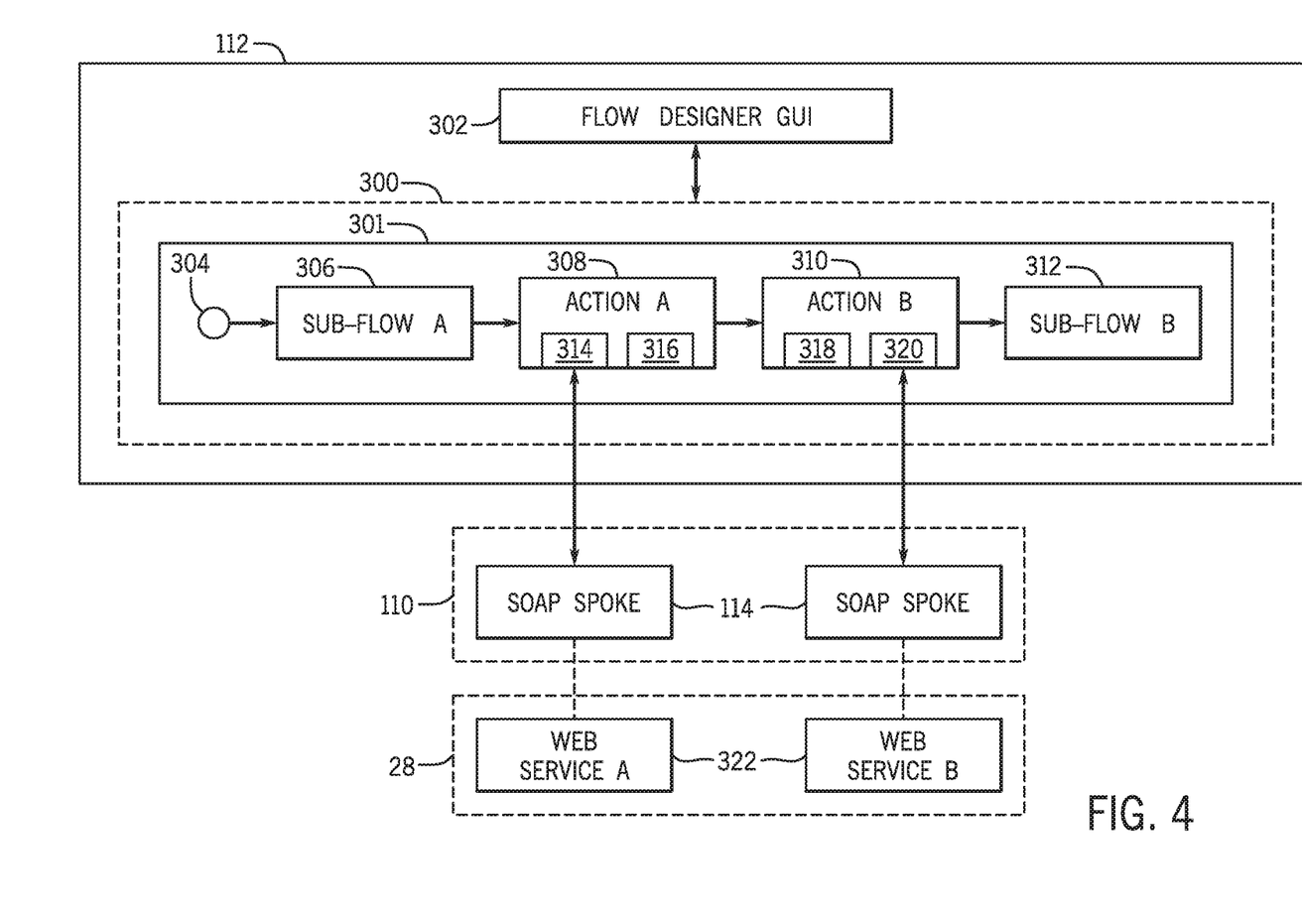
FIG. 4 is a block diagram illustrating a Flow Designer system suitable for creating SOAP objects, in accordance with an embodiment.

Turning now to FIG. 4, the figure is a block diagram illustrating an embodiment of the Flow Designer system 112 suitable for creating information flow objects 300 and for interfacing the flow objects 300 to the external systems 28 via the integration hub system 110. More specifically the block diagram depicts the creation of two SOAP spokes 114 which may then be used, for example via the integration hub system 110 to interface the flow objects 300 with external systems 28. It is to be understood that the integration system 110, and/or the Flow Designer system 112 as depicted are examples only and may be included in or implemented using one or more of the virtual servers 26, the virtual DB servers 104, or a combination thereof. In the depicted embodiment, the Flow Designer system 112 includes a flow designer GUI 302, e.g., a visual information flow creation tool. The flow designer GUI 302 may provide for visual programming via natural languages as opposed to entering text representative of a computer program. The flow designer GUI 302 may include executable code or computer instructions suitable for creating, managing, accessing, and/or editing the flow objects 300. In the depicted embodiment, a single flow 301 is shown in the flow objects 300. It is to be understood that more than one flow may be provided in the flow objects 300.

The flow 301 may include a trigger 304 which may be "fired" or otherwise turned on by certain changed condition, such as a change in one or more records stored in a database (e.g., stored in the virtual DB servers 104). The trigger 304 may additionally be "fired" periodically, for example, as part of a schedule (e.g., hourly schedule, daily schedule, weekly schedule, monthly schedule, and so on). The trigger 304 may thus be used to initiate execution of other flow objects 300, such as sub-flow 306, Action 308, Action 310, and sub-flow 312.

In the depicted embodiment, the trigger 304 initiates execution of the sub-flow 306. The sub-flow 306 may include Actions, control logic (e.g., Boolean logic, branching logic, termination logic), other sub-flows, and so on. The sub-flow 306 may additionally take in inputs and provide outputs. For example, output of the sub-flow 306 may be used as input to the Action 308. The Action 308 may use the inputs provided to execute Steps 314, 316. The Action 308 may also include control logic. Steps, such as the Steps 314, 316, and may be self-contained code, such as scripts (e.g., Java, JavaScript code) provided by the manufacturer of the flow designer system 112. As an example, the Flow Designer system 112 may be provided by ServiceNow™ Inc., of Santa Clara, Calif., U.S.A., under the name Flow Designer™. The Steps 314, 316 may be additionally or alternatively provided by other third parties and/or coded by certain users, such as IT users.

Steps may include any number of functionality, such as requesting approval from other users of the servers 26, 104, creating records in a database table, editing the record in the database table, deleting the records in the database table, creating server tasks, logging messages, looking up database information, notifying of certain events (e.g., incidents, change requests, problems, changes to user records), executing scripts, such as JavaScript, sending email, waiting for a condition to occur, and so on. Action 310 may execute following Action 308. In turn, Action 310 may include Steps 318, 320, and upon completion of Step 320, sub-flow 312 may be executed. Once sub-flow 312 finishes execution, the flow 301 finishes. Flows, such as the flow 301, may not have outputs. The flows may be executable from external clients, such as a clients coupled to the client network 12 shown in FIG. 1.

In the depicted embodiment, Steps 314 and 320 both are shown as using the SOAP Spoke 114 to interact with web service A 322 and web service B 322, respectively. More specifically, the Steps 314, 320 may be SOAP-based steps that may be created via the SOAP wizard 116. The SOAP spokes 114 may provide for functionality to send and receive SOAP messages. For example, SOAP envelope processing may be provided, based on an XML document. The XML document may include an envelope element identifying the XML document as a SOAP message. The XML document may further contain a header element with header information, a body element with call and/or response information, and a fault element containing error and status information. Further details of the SOAP spokes 114 functionality is described below.

Figure 5:
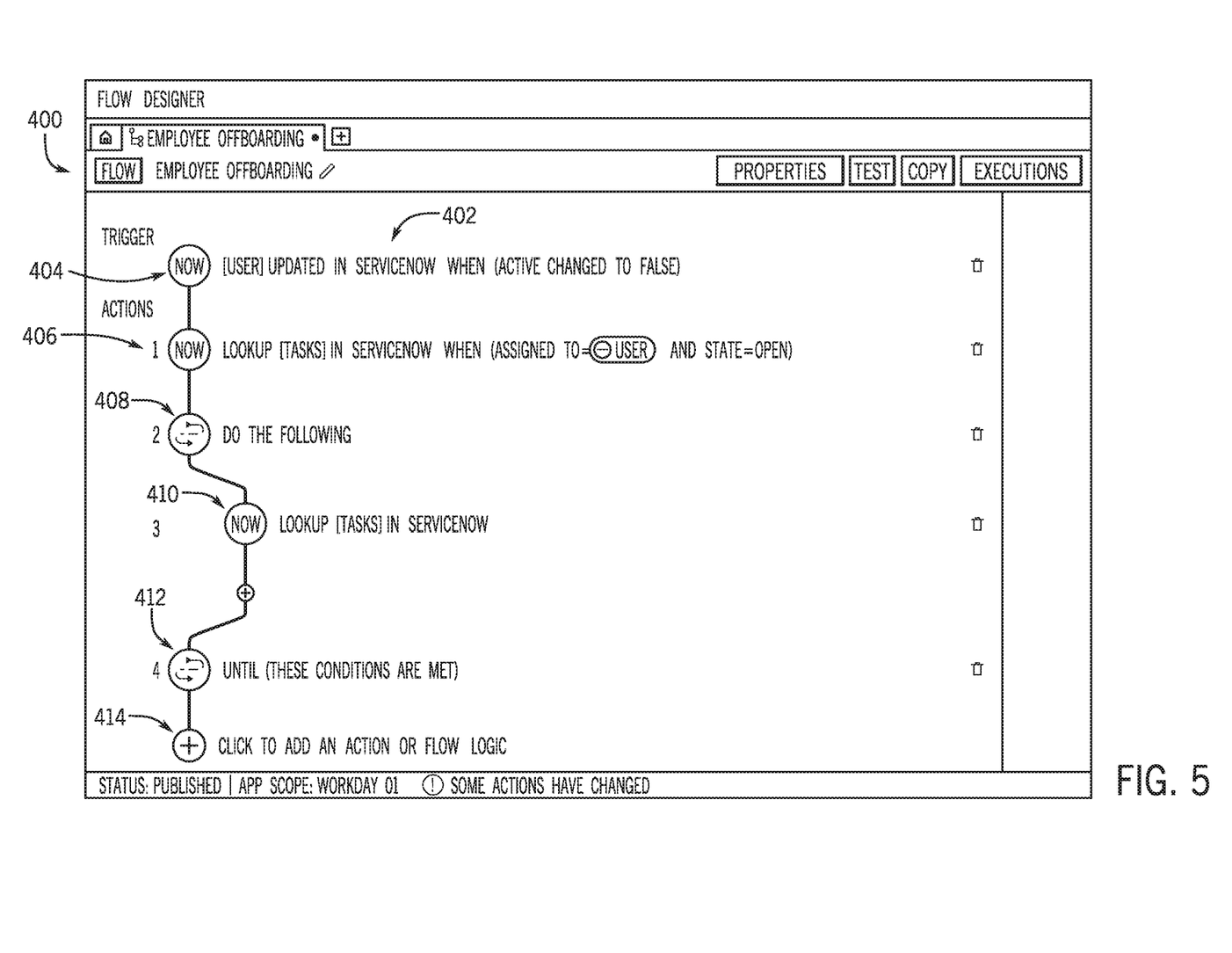
FIG. 5 is a screenshot depicting a graphical user interface (GUI) for the Flow Designer system of FIG. 4, in accordance with an embodiment.

FIG. 5 is a screenshot depicting an embodiment of a graphical user interface (GUI) 400 suitable for inputting certain flow objects 300 into a flow, such as the flow 301. The GUI 400 may be included in the integration hub 110 and used to create the flow 301 via the Flow Designer system 112. In the depicted embodiment, a graphical flow view 402 of a flow is shown. Indeed, the GUI 400 may be used to create and edit any number of graphical flow views that may then be executed as flow objects 300.

In the depicted embodiment, the graphical flow view 402 may start execution via a trigger 404. More specifically, if a certain user record is updated, then the trigger 404 may "fire" and execute Action 406. The Action 406 may then retrieve a set of tasks assigned to the updated user that have an open state. The retrieved tasks may then be further process via a "Do . . . Until" control logic. More specifically, a Do logic 408 may execute one or more Actions, such as Action 410, until the "Until" control logic 410 has its conditions met. More sub-flows and/or Actions may be added, for example, via the "+" control 414. As shown, natural language and visual composition via the flow designer 302 may be used to enable the creation of executable flow objects 300. The flow objects 300 may then be reused by clients connected to the network 12.

Figure 6:
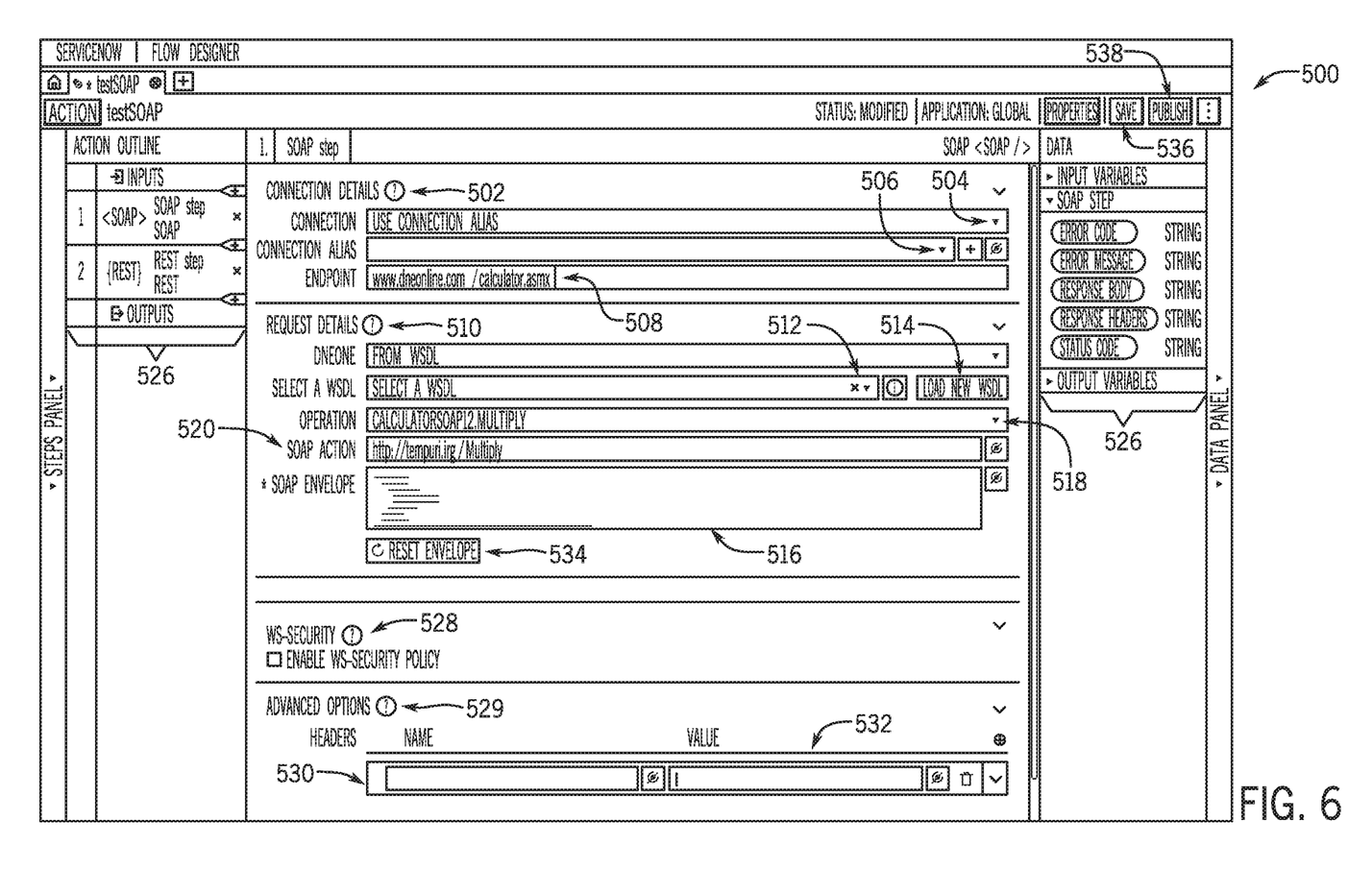
FIG. 6 is a screenshot of an embodiment of a SOAP wizard GUI suitable for inputting SOAP information for the creation of a flow step.

It may be useful to show the creation of a SOAP step, for example, via a SOAP wizard. Accordingly, FIG. 6 is a screenshot illustrating an embodiment of a GUI 500 of the SOAP wizard 116. In the depicted embodiment, the GUI 500 may be used to aid a user into creating a SOAP step, such as the Steps 314, 320, by first connecting to a SOAP endpoint (e.g., endpoint hosting a web service). The SOAP endpoint may include connection information to a desired web service hosted by the external system 28. Accordingly, a connection details section 502 may be used to enter connection information.

In the depicted embodiment, the connection details section 502 includes a connection dropdown list box 504 to provide for use of a connection alias or other connection, and a connection alias dropdown list box 506 that may be used to select a connection alias from a list. An endpoint section 508 is also depicted, which may be used to enter endpoint connection information (e.g., URL to use, IP address, port number, and so on).

A request details section 510 may be used to enter SOAP request details for a SOAP envelope. For example, the SOAP envelope may be built or created from an existing web services definition language (WSDL) source used to describe the web service, e.g., web services 322, 324. To load an existing WSDL (e.g., a WSDL that may be stored in the virtual DB servers 104), a WSDL drop down listbox 512 may be selected, which may list all WSDLs that are available locally. However, the user may also activate a button 514 to launch a dialog box to access, via the networks 12 and/or 14, various online WSDLs. Regardless of how the user selects the WSDL (e.g., through local storage or online), the GUI 500 may parse the WSDL and then provide the XML that corresponds to the SOAP envelope in an editor section 516. The user may then select certain operations provided by the web service via an operation drop down listbox 518.

A SOAP action corresponding to the selected operation may then be listed in SOAP action section 520. The user may then enter certain values, such as input variables, error codes, error messages, response body information, response header information, status code information, output variables, and so on, via a data section 522. Additionally or alternatively, the user may edit the XML directly on the editor section 516.

Web services security (WS-Security) may also be provided via security section 528, including using security policies that specify how integrity and confidentiality is enforced on SOAP messages. The WS-Security may also specify certain security token formats to use, such as Security Assertion Markup Language (SAML), Kerberos, X.509, and so on. XML signature and XML encryption may also be used to provide for end-to-end security. An action outline section 526 may show all steps in an action. In the depicted embodiment, a single SOAP step and a single Representational State Transfer (REST) step is shown, but an action may include multiple steps, including steps of different types (e.g., SOAP steps, REST steps, steps based on Flow Designer system 112 functionality, and so on).

The techniques described herein also provide for creating custom HTTP headers when messaging via HTTP via an advanced section 529. Accordingly, a user may easily customize an HTTP header that is to be used during messaging of the SOAP envelope to add, for example, session id information, content type, content length, cache directives, and so on, that may be transmitted independent of the transport that the SOAP envelope may use. A name section 530 may be used to enter a name for a header field, and a value section 532 may be used to enter a value for the header field. A reset button 534 is also provided, suitable for resetting the SOAP envelope, for example, to enter new values. A save button 536 may be used to save the SOAP step, including the corresponding SOAP envelope. Each SOAP envelope may comply with W3C specifications, such as SOAP versions 1.1 and/or 1.2. Accordingly, the SOAP envelope (e.g., <envelope> . . . </envelope>) may include an optional SOAP header section having one or more SOAP headers (e.g., "<header> . . . </header>" detailing, for example, application related information, and a body section (e.g., <body> . . . </body>) containing information intended for the recipient of the message. The SOAP envelope may be encapsulated or otherwise contained inside of and HTTP request (e.g., POST request).

Once the SOAP step is as desired, the user may activate a publish button 536. Activation of the publish button 536 may then expose the SOAP step and/or SOAP interface that has been created for use by one or more clients, such as the clients connected via the networks 12, 14. The techniques described herein enable "scoped" applications. For example, the user may create a private scope that may limit accessibility to only the user and/or entities enabled by the user. The private scope may be used to develop and to test the SOAP steps. Once the SOAP steps are tested, the user may change the scope to a broader scope, e.g., public scope, and publish the steps and/or application via a publish button 536. The be published in various ways, such as publishing to production instances, to online application stores, and/or via sharing facilities. Indeed, activation of the publish button 536 may then expose the SOAP step and/or SOAP interface that has been created to a variety of locations. Accordingly, the SOAP step, e.g., Steps 314, 320, may be more easily created, integrated, and reused into actions, flows, and so on, by a variety of clients.

Figure 7:
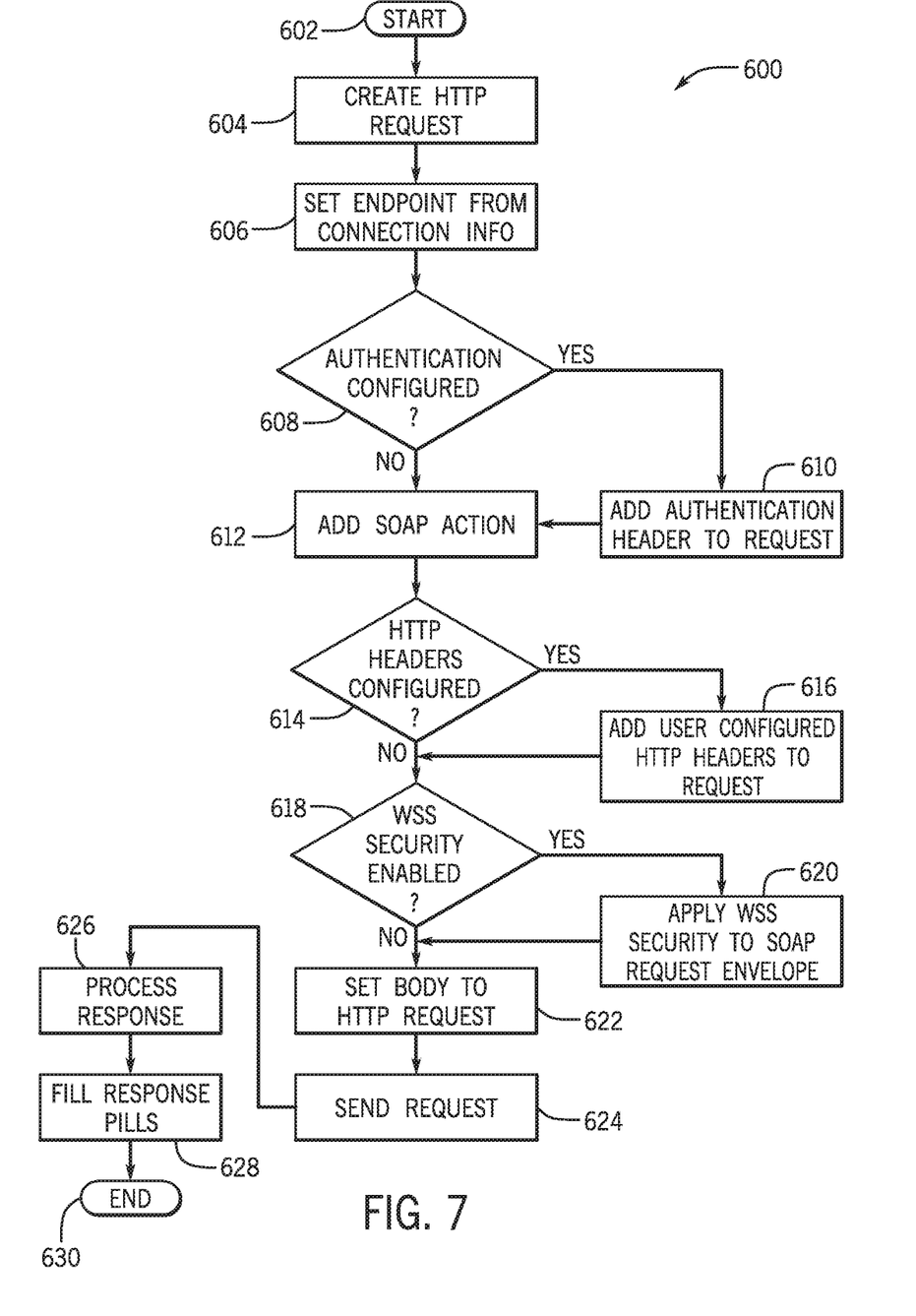
FIG. 7 is a flowchart of an embodiment of a process suitable for implement SOAP requests and responses.

FIG. 7 is a flowchart illustrating an embodiment of a process 600 suitable for implementing SOAP requests and responses. The process 600 may be implemented as computer instructions or code executable via the processor(s) 202 and stored in the memory 206. The process 600, for example, may be executed via the Flow Designer system 112 and/or the integration hub 110.

After a start block 602, the process may create (block 604) an HTTP request that may then contain a SOAP envelope. That is, the HTTP request may contain or otherwise "wrap" a SOAP envelope writing in XML and detailing various sections (e.g., SOAP header section which may include one or more SOAP headers and a SOAP body section which may include one or more body subelements as defined by SOAP W3C specification 1.1 and/or 1.2). For example, an HTTP POST request may be created, to include certain SOAP information described in more detail below. The process 600 may then set (block 606) an endpoint for the HTTP request based on connection information. For example, if using a WSDL, the path to the WSDL may be used. Connection information may be provided via the connection details section 502 of the GUI 500.

The process 600 may then determine (decision 608) if authentication has been configured for the request. If authentication has been configured, then the process 600 may add (block 610) an authentication header to the HTTP request. If no authentication has been configured (decision 608) or after adding authentication (block 610), the process 600 may then add (block 612) a SOAP action to the HTTP request. For example, the SOAP action selected via the SOAP action section 520 of the GUI 500 may be added (block 612).

The process 600 may then determine (decision 614) if HTTP headers are configured. For example, HTTP headers may be configured by the user via the advanced section 528 of the GUI 500. If HTTP headers are configured (decision 614), the process 600 may then add (block 616) the HTTP headers to the HTTP request, for example based on the information entered in the advanced section 528 of the GUI 500. The process 600 may then determine (decision 618) if WSS Security is enabled. For example, WSS Security may be enable via the WSS Security section 528 of the GUI 500.

If WSS Security is enabled (decision 618), the process 600 may then apply (block 620) WSS Security to the SOAP request envelope. For example, certain security policies may be applied based on user preferences. The process 600 may then create (block 622) the SOAP envelope, for example, by adding a SOAP header section and a SOAP body section to the HTTP request based on the information gathered. That is, XML corresponding to the SOAP envelope may be written into the HTTP request to comply with W3C specifications, such as SOAP versions 1.1 and/or 1.2 specifications.

The now SOAP-formed HTTP request may be sent (block 624), for example, to the external system 28 so that the external system 28 can process the request and return results. A response from the external system 28 may then be processed (block 626). For example, results from the external system 28 may be received and processed. The response may be provided (block 628) as "data pills." For example, objects created via the Flow Designer system 112 may then use the data pills to retrieve the results and to use the results in their internal processing.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A computing system, comprising:
a server communicatively coupled to a data repository and configured to store a data in the data repository, wherein the server comprises a processor configured to perform operations comprising:
creating, via a visual information flow creation tool, at least one information flow object;
creating a simple object access protocol (SOAP) communication interface to be implemented by the at least one information flow object, wherein the SOAP communication interface is configured to enable the at least one information flow object, during execution, to provide a SOAP request to, and to receive a SOAP response from, an external system, and wherein the SOAP request includes a SOAP envelope identifying at least one SOAP action executable by the external system; and
executing the at least one information flow object to communicate with the external system via the SOAP communication interface, wherein the external system is configured to provide the SOAP response to the at least one information flow object via the SOAP communication interface in response to executing the at least one SOAP action identified in the SOAP envelope of the SOAP request.

2. The computing system of claim 1, wherein creating, via the visual information flow creation tool, the at least one information flow object comprises creating, via the visual information flow creation tool, a flowchart having the at least one information flow object in lieu of entering text for a computer program when creating the at least one information flow object.

3. The computing system of claim 2, wherein the SOAP GUI comprises a section configured to load a web services description language (WSDL) file for a web service provided by the external system.

4. The computing system of claim 3, wherein the SOAP GUI is configured to parse the WSDL and to derive a SOAP envelope, wherein the SOAP GUI comprises an action section to select one or more actions executable by the web service via the SOAP envelope.

5. The computing system of claim 4, wherein the SOAP GUI is configured to provide an input section configured to receive one or more input values to be given as inputs when the one or more actions are executed.

6. The computing system of claim 4, wherein the SOAP GUI is configured to provide for an editor configured to edit the SOAP envelope.

7. The computing system of claim 1, wherein creating the SOAP communication interface comprises executing a SOAP wizard, wherein the SOAP wizard is configured to generate a SOAP graphical user interface (GUI) that is presented on a display of a communicatively coupled client device, wherein the SOAP GUI is configured to receive inputs defining aspects of the SOAP communication interface.

8. The computing system of claim 7, wherein creating the SOAP communication interface comprises transmitting, via the SOAP wizard, a SOAP envelope displayed by the SOAP GUI, and receiving, via the SOAP wizard, a result of executing an action included in the SOAP envelope.

9. The computing system of claim 8, wherein the result is received before publishing the SOAP communication interface.

10. The computing system of claim 1, wherein the at least one flow object comprises a flow step, and wherein the operations comprise publishing the flow step to provide the flow step for execution to a plurality of clients of the server.

11. The computing system of claim 10, comprising an integration hub system, wherein creating the SOAP communication interface, publishing the flow step, or a combination thereof, is provided via the integration hub system.

12. A method, comprising:
creating, via a visual information flow creation tool included in a server communicatively coupled to a data repository, at least one information flow object;
creating a simple object access protocol (SOAP) communication interface to be implemented by the at least one information flow object, wherein the SOAP communication interface enables the at least one information flow object, during execution, to provide a SOAP request to, and to receive a SOAP response from, an external system, and wherein the SOAP request includes a SOAP envelope identifying at least one SOAP action executable by the external system; and
executing the at least one information flow object to communicate with the external system via the SOAP communication interface, wherein the external system provides the SOAP response to the at least one information flow object via the SOAP communication interface in response to executing the at least one SOAP action identified in the SOAP envelope of the SOAP request.

13. The method of claim 12, wherein creating, via the visual information flow creation tool, the at least one information flow object, comprises creating, via the visual information flow creation tool, a flowchart having the at least one information flow object in lieu of entering text for a computer program when creating the at least one information flow object.

14. The method of claim 12, wherein creating the SOAP communication interface for the at least one step comprises executing a SOAP wizard comprising a SOAP graphical user interface (GUI) configured to guide a user to create the SOAP communication interface.

15. The method of claim 12, comprising publish a flow step to make the flow step available via the data repository, wherein the information flow object comprises the flow step.

16. A non-transitory, computer-readable medium storing instructions executable by a processor of a computing system, the instructions configured to:
create, via a visual information flow creation tool included in a server communicatively coupled to a data repository, at least one information flow object;
create a simple object access protocol (SOAP) communication interface to be implemented by the at least one information flow object, wherein the SOAP communication interface is configured to enable the at least one information flow object, during execution, to provide a SOAP request to, and to receive a SOAP response from, an external system, and wherein the SOAP request includes a SOAP envelope identifying at least one SOAP action executable by the external system; and
execute the at least one information flow object to communicate with the external system via the SOAP communication interface, wherein the external system is configured to provide the SOAP response to the at least one information flow object via the SOAP communication interface in response to executing the at least one SOAP action identified in the SOAP envelope of the SOAP request.

17. The computer-readable medium of claim 16, wherein the instructions configured to create via the visual information flow creation tool, the at least one information flow object, comprises instructions configured to create, via the visual information flow creation tool, a flowchart having the at least one information flow object in lieu of entering text for a computer program when creating the at least one information flow object.

18. The computer-readable medium of claim 16, wherein the instructions configured to create the SOAP communication interface for the at least one step comprise instructions configured to execute a SOAP wizard comprising a SOAP graphical user interface (GUI) configured to guide a user to create the SOAP communication interface.

19. The computer-readable medium of claim 16, wherein the instructions are configured to publish a flow step to make the flow step available via the data repository, wherein the information flow object comprises the flow step.

20. The computer-readable medium of claim 19, wherein the data repository comprises a cloned data repository.

* * * * *